United States Patent Office 3,086,865
Patented Apr. 23, 1963

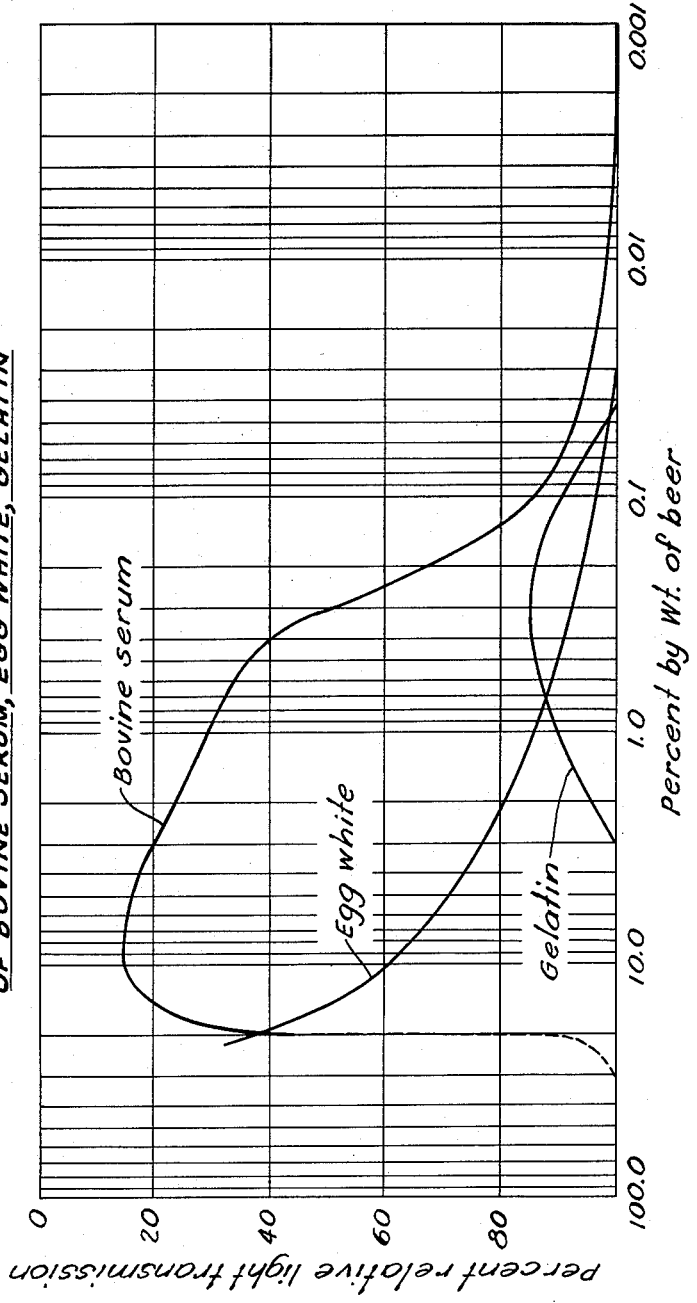

3,086,865
CLARIFICATION OF BEVERAGES WITH ANIMAL BLOOD ALBUMIN
Wilhelm E. Walles, James J. Davies, and William L. Gold, Midland, Mich., assignors to The Dow Chemical Company, Midland, Mich., a corporation of Delaware
Filed Sept. 30, 1960, Ser. No. 59,592
6 Claims. (Cl. 99—28)

The present invention relates to the treatment of various essentially clear or limpid beverages to materially improve their clarity and transparency or translucence and to render them stable against development of haze subsequent to treatment. The invention has particular reference to the low temperature clarification of many beverages. It is especially concerned with such treatment for the several alcoholic malt beverages and the like, including beer, ale, porter and so forth.

Many essentially clear liquid beverages, or beverages intended to be of an essentially clear or limpid character, are liable to be obtained in their as-manufactured state with some degree of haziness or cloudiness that persists despite filtration, or to develop such a condition upon standing or being chilled, or both. It is quite common, of course, for beverages to be stored, sometimes under refrigeration, after their manufacture. Besides, they are frequently chilled prior to consumption to enhance their palatableness. Such haziness, including "hazing on standing" and "chill haze," occurs frequently in the several essentially clear or limpid beverages, both non-alcoholic and alcoholic in nature, that are derived from various grains, fruits, berries and vegetables or mixtures thereof. Of course, most of the alcoholic beverages are prepared by fermentation processes and are often obtained as distilled or spirit fortified products. In addition, many beverages are often carbonated, either by natural or artificial means, and may be artificially sweetened with sugar or other saccharine materials.

Hazing in essentially clear beverages is generally believed to be primarily caused by pectins and tannins and the like (whose solubilities may range from being completely insoluble to completely soluble substances and which may be colloidal or otherwise efficiently dispersible materials), as well as other dark colored soluble or partially soluble materials that are obtained in the beverage during its manufacture. In some instances, proteinaceous constituents may also be responsible for the hazing phenomena in beverages. It has been proposed, for example, that a protein tannin complex in beer, which frequently contains traces of such heavy metals as copper and iron, is responsible for clouding, particularly chill hazing, of the beverage. Such complexes are also felt to be responsible for off-flavors in the beer and the like malt beverages because of their propensity to induce oxidation of some constituents of the beverage or due to organic reduced sulphur in the complex, or both. Insoluble constituents, including a large part or all of the completely insoluble pectins and tannins, can ordinarily be removed quite readily from a beverage by ordinary filtration procedures. Such physical treatment, however, does not accomplish removal of the soluble or efficiently dispersed pectins, tannins and other dark colored substances (which frequently are of high molecular weight and which may be relatively unstable in nature), including those in protein complexes, that engender the above-mentioned turbidity and hazing phenomena. Furthermore, the efficiently dispersible pectins, tannins and protein complexes may often be responsible for many difficulties in the filtration of the beverages.

It would be advantageous, and it is the chief aim and concern of the present invention, to provide a high efficacious agent for the treatment of essentially clear beverages that would be capable of coagulating and precipitating therefrom the water-soluble or otherwise efficiently dispersible colloidal pectins, tannins and other dark colored soluble and partially soluble or otherwise dispersible substances that are responsible for producing the hazing phenomena in the beverage. It would be a corollary advantage of commensurate magnitude, and it is the principal object of the present invention, to provide a process for the material clarification and stabilization against hazing of essentially clear beverages using the referred-to coagulating and precipitating agent. It would be of exceptional benefit if a clarifying process of the indicated variety could be provided which would be especially well suited for practice at low temperatures without necessitating heating of the beverage being treated to undesirable temperature levels. Other benefits and objects will become apparent hereinafter as the invention is more fully delineated.

It is to be fully understood, incidentally, that the operability and utility of the present invention is neither dependent upon nor to be evaluated in the light of an exact identification or characterization of the substances that cause hazing in beverages. The reference to them as including pectins, tannins and proteinaceous complexes is merely set forth upon the basis of reasonable information and belief. And, as is hereinafter demonstrated, such substances, regardless of their specific nature, are efficaciously coagulated and precipitated from beverages of the indicated type by use of the herein contemplated treating agents.

In accordance with the practice of the present invention whereby the above-mentioned and hereinafter more specifically manifest objects, advantages and benefits may be achieved, essentially clear or limpid beverages may be advantageously treated for removal of pectins, tannins, protein complexes and dark colored soluble materials of naturally occurring origin in order to be clarified and rendered stable against hazing by a process which comprises adding to the beverage being treated a minor proportion of from about 1.4 to about 0.0007 percent by weight, more advantageously from about 0.035 to about 0.021 percent, based on the weight of the beverage being treated, of a coagulating and precipitating agent for the haze and turbidity-inducing ingredients in the beverage that consists of animal blood albumin and then filtering the coagulated and precipitated turbidity-inducing ingredients, or otherwise physically separating and isolating them from the beverage. The broad range encompasses that range of concentrations over which effective clarification of the beverage is obtained. At higher concentrations of the animal blood albumin, resolubilization of the precipitate begins to occur. The lower limit corresponds to the concentration at about which precipitation of the haze inducing ingredients of the beverage is first observable. The narrower preferred range designates the albumin concentration range over which rapid flocculation is obtained. Rapid flocculation means that effective precipitation and coagulation occurs within about 10 minutes.

As employed herein for the purposes of the specification and the claims, the terminology "animal blood albumin" refers to the proteinaceous fraction of animal blood plasma. While it is preferred to employ the animal blood albumin in its natural state, i.e., in the form of animal blood plasma, it may be, in certain instances, desirable to further concentrate the plasma or otherwise subject it to physical separatory procedures such as fractionation and partial denaturization to obtain the almumin in an isolated form. It is necessary that physical separatory means be employed which do not destroy the complexibility of the animal blood albumin with the haze inducing ingredients of beverages. An example of such a procedure is vacuum distillation carried out at temperatures less than about 80°, preferably less than about 60° C. At temperatures of about 80° C. and above, the proteins of animal blood albumin coagulate irreversibly in which form they are relatively ineffective in the present invention.

Animal blood plasma is the product obtained by removing the blood cells from whole animal blood such as that obtained from cattle, swine and sheep. Methods for accomplishing this separation are well known. They usually involve either sedimentation or centrifugation procedures and such use of anticoagulants and coagulants as will permit a timely and efficacious separation of the blood cells. Blood albumin constitutes from about 6 to 7 percent of animal blood plasma, with the remainder of the plasma consisting of about 92 percent water and from 1 to 2 percent of other solids such as fats, sugars, salts and the like trace constituents of animal blood plasma. The dried water-soluble blood albumen contains about 80 percent protenaceous constituents, 5 percent moisture and about 15 percent other solids.

The above-indicated treating quantities of the animal blood albumin are not absolute since, in certain cases, greater or lesser proportions of the agent may be suitable and effective. Thus, any quantity of the animal blood albumin that is an amount that is adequate to materially precipitate the haze-inducing ingredients from a given beverage may be utilized in the practice of the invention. After the precipitated haze-inducing ingredients have been isolated from the clarified beverage, the product may be further processed and chilled for storage and handling at any desired lower temperature or, if desired, may be permitted to remain at the temperature of treatment.

The treatment of the beverage may be advantageously accomplished at any moderate temperature. Effective results can be obtained when the beverage is treated at any temperature at or above its freezing point and below the temperature at which the beverage being treated is deleteriously affected. While the animal blood albumin is a highly efficient and efficacious precipitating and coagulating agent up to about 80° C., a treatment temperature of about 40° C. is usually a suitable upper limit. Preferably, beer is treated at temperatures above its freezing point and below an upper limit of about 15° C.

The treatment can be performed by directly adding the animal blood albumin in the form of natural blood plasma or as water-soluble dried blood to the beverage and permitting the desired coagulation and precipitation of the pectins, tannins and other efficiently dispersed haze-inducing ingredients to occur followed by removal of the precipitate and recovery of the clarified beverage. A suitably prepared water-soluble dried blood may, of course, be added in the form of an aqueous solution or dispersion, preferably as a relatively concentrated composition in the liquid vehicle to the beverage being treated.

The following procedure is set forth to further illustrate the present invention in a manner in which it is carried out.

To 100 milliliters of a commercially available bottled beer having an alcohol content of about 3½ percent there was added one milliliter of bovine blood plasma containing 7.1 percent protein, i.e., blood albumin, 91.3 percent water and 1.6 percent other solids comprising fats, sugars, salts and the like trace constituents of animal blood plasma. Both the beer and the plasma added to the beer were at room temperature. Upon addition of the plasma, cloudiness became immediately apparent in the treated beverage and while the invention is in no way dependent upon the true characterization of this cloudiness, it is believed that it consisted of a dispersion of one or more complexes formed by the proteins of the plasma and ingredients in the beverage complexible therewith. Upon standing, the sample became appreciably more cloudy and in less than an hour, the sample was observed to have a fine, distinct precipitate which had settled out on the bottom of the vessel in which it was contained. The treated beer sample filtered rapidly through ordinary filter paper to yield a clear beer.

In a manner similar to that of the foregoing, additional runs were made employing varying quantities of the bovine plasma. All samples of the beer thus treated were submitted to spectrophotometric tests to determine the relative light transmission for each sample as compared to an identically contained volume of untreated beer. Light transmission values were obtained with a Fisher Nefluorophotometer using the 425 millimicron filter. The results of these tests are graphically depicted in the accompanying drawing.

To further illustrate the unique capacity of animal blood proteins as clarifying agents for beverages, comparative flocculation curves are also presented showing the effects obtained under identical conditions to that of the foregoing experiment for egg white (albumen) and gelatin derived from animal colagen and bone. While the egg albumen gave what appeared to be a high differential of relative light transmission, most of the indicated hindrance to light transmission is attributable to the egg whites themselves. Furthermore, it should be noted that such effects were obtained only at concentrations in excess of about 10 percent by weight of the treated beer as compared to the 0.7 percent or so concentration of the proteinaceous albumin constituent of the bovine plasma. The high percentage of relative light transmission obtained throughout the curve with the gelatin treated samples indicates that it is relatively ineffective as a precipitating and coagulating agent. From the foregoing comparisons, it is readily apparent that animal blood albumin is uniquely effective as a precipitating and coagulating agent for clarifying beverages.

Excellent results similar to those obtained in the foregoing example are achieved by incorporating animal blood albumin into such beverages as ale, porter, the various grape and other fruit or berry wines, champagne, sake, brandy, whisky, gin, vodka, tequila, cider (sweet or hard), such unfermented fruit juices as apple juice, grape juice and the like, cranberry juice and other clear berry juices, sweet or so-called "soft" drinks (both carbonated and non-carbonated, either before or after carbonation) to provide a clarified beverage similarly stabilized against haze.

What is claimed is:

1. A process which comprises adding to an essentially limpid, fermented beverage containing a fruit derivative, said beverage being at a temperature within the range from its freezing point to less than 80° C., a minor proportion of between about 1.4 and about 0.0007 percent by weight based on the weight of the beverage, of a coagulating and precipitating agent consisting of animal blood albumin whereupon the haze-inducing ingredients of the beverage are coagulated and precipitated from said beverage.

2. The process of claim 1 wherein said treatment is performed at a temperature between the freezing point of the beverage and about 40° C.

3. The process of claim 1 wherein said beverage is beer and said treatment is performed at a temperature between the freezing point of the beer and about 15° C.

4. The process of claim 1 including the additional subsequent step of permitting said coagulated and precipitated haze-inducing ingredients to settle in said beverage.

5. The process of claim 1 including the additional subsequent sequence of steps of permitting said coagulated and precipitated haze-inducing ingredients to settle in said beverage and physically separating said settled ingredients from the clarified beverage product.

6. A process which comprises adding to an essentially limpid, fermented beverage containing a fruit derivative, said beverage being at a temperature within the range from its freezing point to less than 80° C., a minor proportion of between about 0.035 and about 0.021 percent by weight based on the weight of the beverage, of a coagulating and precipitating agent consisting of animal blood albumin whereupon the haze-inducing ingredients of the beverage are coagulated and precipitated from said beverage.

References Cited in the file of this patent

UNITED STATES PATENTS

| | | |
|---|---|---|
| 2,086,891 | Bachmann | July 13, 1937 |
| 2,241,868 | Reimann | May 13, 1941 |
| 2,472,252 | Hughes | June 7, 1949 |